Oct. 30, 1945.
J. HOEH
2,387,905
WELDING ELECTRODE
Filed May 15, 1944
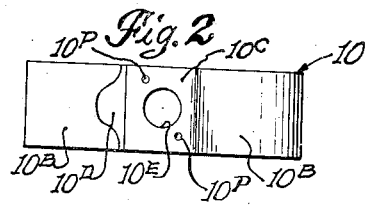
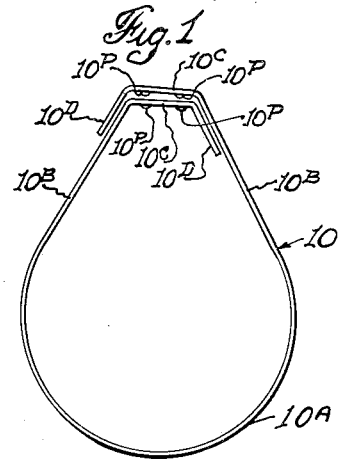
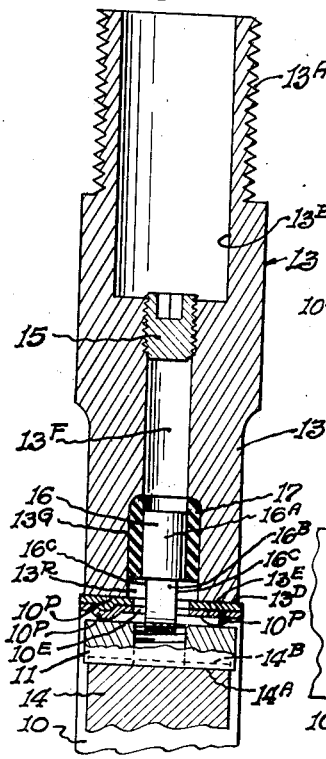
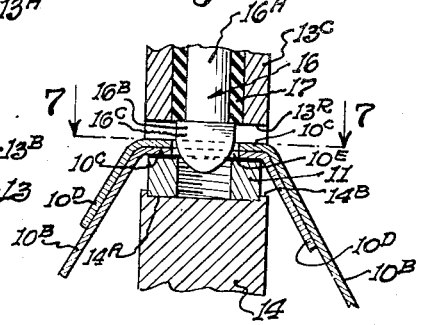
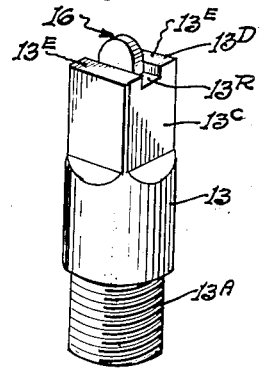
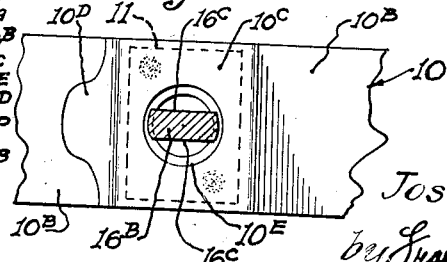
Inventor
Joseph Hoeh
by Frank Schraeder Jr.
Attorney.

Patented Oct. 30, 1945

2,387,905

UNITED STATES PATENT OFFICE 2,387,905

WELDING ELECTRODE

Joseph Hoeh, Congress Park, Ill., assignor to Witlek Manufacturing Co., Chicago, Ill., a corporation of Illinois Application May 15, 1944, Serial No. 535,713

6 Claims. (Cl. 219—4)

This invention generally relates to resistance welding which involves the passage of an electric current through the adjacent portions of the metallic members to be welded. Heat is generated at the points of contact where the greatest resistance to the flow of the current is encountered while pressure is applied to force the members together and form the weld.

More particularly, the present invention relates to electric-resistance welding of the type known as spot welding and has specific reference to a new and improved welding electrode for use in spot welding.

Electric resistance welding involves numerous engineering problems such as regulating the mechanical pressure and rate of advance of the parts toward one another at various stages of the process of heating the metal at the surfaces of contact, arresting the process at the proper instant, and the regulation of the current to the most suitable amount at all stages of the process; however, my invention is directed to the improvement of the spot welding electrodes to thereby overcome certain disadvantages in presently employed electrodes and to enhance and facilitate spot welding operations.

My improved electrode is particularly adapted to spot welding of metallic members, sheets or strips of thin gauge, such as flexible metallic strips employed in hose clamp bands wherein portions of same are welded to other portions thereof or wherein the ends thereof are connected together.

I have found that in spot welding hose clamp bands the use of electrodes having pointed, rounded, or spherically shaped tips results in excessive flashing and formation of oxides and the attendant discharge of fine molten metal. In certain operations of hose clamp manufacture, as where the ends of a clamp band are provided with perforations for passage therethrough of the band-tightening screw and which band ends are welled to a threaded nut with said perforations aligned with the threaded opening in the nut, welding with a pointed electrode causes a discharge of molten metal particles and oxides into the threaded opening within the nut and thus requiring the retapping of the nut. Furthermore, I have found in such particular clamp manufacture that where a pilot depends below an undivided flat welding face of a spot welding electrode, that is, where the flat contact face is not ventilated or provided with a transverse slot, some of the discharged metal particles or oxides become deposited on and attached to the flat contact face of the electrode as well as the pilot with the disadvantage that the electrode contact face and pilot must frequently be refinished or cleaned to remove such deposits.

It is therefore an object of my invention to provide an electrode of novel construction which will overcome the above-recited disadvantages of present spot welding; such novel electrode construction including the adaptation of the contact face of the electrode to the welding together of metal strips or sheets which are provided with, preferably integral, protrusions on one or both of the opposed faces of the strips or sheets to be welded together and such adaptation including the provision of a flat contact face having at least one slot disposed across such flat face; and where clamp band ends having aligned perforations for the tightening screw are welded to a nut having a threaded opening in register with said perforations, then such adaptation preferably includes a pilot projecting downwardly from the slot in the contact face to a point below the plane of such flat contact face.

Among other objects of my invention is to provide a new and improved electrode which is particularly adapted for spot welding one or more metallic members to another metallic part where one or more of said members, or said part, are provided with one or more integral protrusions through which the welding current is concentrated in its flow between a pair of opposed electrodes to thereby produce an improved spot-welded connection of said one or more members to said part.

Another object of my invention is found in the provision of novel spot welding electrodes which are provided with flat contact faces adapted to spot weld one or more metallic members to another metallic part at spaced spots or areas where said one or more members are formed with integral protrusions through which protrusions the flow of the current between the flat faces of the electrodes is concentrated to produce a plurality of spaced spot welds disposed within the areas of the flat faces of the electrodes.

Another object of my invention resides in the provision of a preferably hollow water-cooled spot welding electrode having a flat but slotted contact face dividing such contact face into spaced flat pressure-exerting and current conducting areas adapted to be positioned over predetermined protrusions of the members to be welded, each protrusion being substantially equal in area to the area of the spot weld desired thereat.

Still another object of my invention is found in the provision of a spot welding electrode having a flat but slotted contact face which is particularly adapted for spot welding overlapped ends of a hose clamp band to a threaded nut, and which ends are frequently provided with aligned perforations for the band-tightening screw and also are provided with one or more integral protrusions adapted, upon compression between the electrodes and the simultaneous passing of an electric current therethrough, to form the desired spot welds whereby the ends of the clamp band are securely welded to the threaded nut; such electrode being preferably provided with a flat slotted contact face and with a pilot which depends from the slotted portion of the electrode downwardly below the plane of its flat contact face and which pilot functions to assist in retaining the perforated band ends in proper relative alignment one to the other and to the threaded opening in the nut and also functions to keep the threads in the nut substantially free from particles of molten metal and oxides incidental to the electrical flash at the moment of welding.

My invention is herein preferably exemplified in the welding operation employed to secure overlapped ends of a flexible metal band to a threaded nut such as the band and nut employed in the construction of a hose clamp shown in patent appplication Serial No. 516,121 filed by Benjamin A. Tetzlaff, however, my improved electrode is obviously not limited to welding of hose clamp bands but may be used for welding one or more metallic members to another metallic member or part where one or more of said members, or said part, are provided with one or more, preferably integral, protrusions disposed between adjacent faces of such members being welded, said protrusions cooperating with the flat contact faces of the electrodes for concentrating the flow of the electric current through such protrusions while pressure is simultaneously exerted by the electrodes to heat and collapse such protrusions to thereby cause a spot welding of said members thereat.

In the drawing:

Fig. 1 is a side elevation of a hose clamp band having overlapping ends provided with integral protrusions and which overlapped band ends are adapted to be welded to a nut by my improved electrodes;

Fig. 2 is a plan view of the clamp band shown in Fig. 1;

Fig. 3 shows a side elevation of my improved electrodes during the process of welding the overlapping ends of the clamp band to the nut shown supported on the lower electrode;

Fig. 4 is an end elevation of the electrodes and clamp band shown in Fig. 3 with a portion of the clamp band broken away to show the lower electrode;

Fig. 5 is a vertical section through an upper electrode embodying my invention taken on line 5—5 of Fig. 3;

Fig. 6 is a vertical section through the tip end of the electrode taken at a right angle to the section shown in Fig. 5;

Fig. 7 is a horizontal cross-section taken on line 7—7 of Fig. 6; and

Fig. 8 is a perspective view of the electrode shown in Figs. 5, 6 and 7 but in reduced scale and in inverted position to show more clearly the transverse slot.

In the illustrations, the clamp band 10 consists of a strip of flexible metal formed to provide a substantially circular medial portion $10^A$ having converging portions $10^B$ provided with laterally bent overlapping portions $10^C$ terminating in bent tabs $10^D$. The overlapped portions $10^C$ are provided with central perforations $10^E$ for passage therethrough of a band-tightening screw (not shown herein) and which screw is adapted to be threaded into the nut 11, shown in Figs. 3 to 7 inclusive, and to which nut 11 the overlapped ends $10^C$ are welded when the clamp band is finally assembled.

Since this specification is directed to electrode improvements and not to a hose clamp which is used in the illustrations simply as a convenient way to illustrate the operation of my improved electrodes, only the clamp band and the nut elements of the hose clamp are shown in the attached drawing.

Prior to the welded connection of the nut 11 to the overlapped band end portions $10^C$, these portions $10^C$ are die-stamped while in overlapped position to provide pairs of nested protrusions $10^P$ which are more clearly seen in Fig. 5.

My improved electrode as preferably shown in Figs. 5 to 8 inclusive consists of an elongated body 13 made from any suitable material chiefly of copper or copper alloy having a hollow exteriorly threaded upper portion $13^A$ adapted for threaded connection with a movable electric current conductor arm of welding apparatus, the cavity $13^B$ being adapted to receive therein a cooling fluid such as water.

The lower or operative tip portion $13^C$ is provided with a flat horizontal face or flat contact end $13^D$ which is divided by at least one slot or recess $13^R$ extending transversely across the contact end into the body of the electrode to thereby divide the contact end into a pair of spaced contact faces $13^E$.

The cooperating lower electrode 14 is provided with a flat horizontal upper contact face $14^A$ which is parallel to the contact faces $13^E$ of the upper electrode 13 and the face $14^A$ is preferably formed slightly depressed below a pair of parallel narrow upstanding integral side strip portions $14^B$ for facilitating the retainment of the nut 11 therebetween when positioned upon the lower electrode 14.

Assuming that the clamp band 10 shown in Figs. 1 and 2 is not provided with the perforations $10^E$ but that it is formed as otherwise shown with the protrusions $10^P$, the overlapped end portions $10^C$ may be readily spot welded to one another and to the nut 11 by mounting the nut 11 upon the lower electrode 14, then inserting the band 10 over the lower electrode so that the overlapped portions $10^C$ are positioned upon the nut 11, as shown in Fig. 3, and then causing a movement of the electrodes toward one another to forcibly and with proper pressure engage the overlapped portions $10^C$ and nut 11 between the electrodes while electric current is caused to flow between the electrodes in concentrated paths through the protrusions $10^P$ while such protrusions due to the applied pressure and heat collapse and form clean spot welds to thereby secure the overlapped portions $10^C$ to the nut 11. In such operation, the spot welds are produced by the pair of flat contact faces $13^E$ in a simple and efficient manner and any accompanying flash and discharge of molten particles or oxides passes outwardly from the electrode through the ends of the slot $13^R$, in fact, the use of my improved transversely ventilated flat faced spot welding electrode operates to quench the usual incidental flash to thereby reduce same and the oxides to a minimum.

My improved upper electrode is particularly adapted for spot welding the overlapped ends 10$^C$ of the clamp band 10 to a nut 11 as illustrated in Figs. 1 to 4 inclusive where such overlapped ends 10$^C$ are provided with the perforations 10$^E$ which must register with the threaded opening in the nut 11. To facilitate such welding operation, the electrode body 13 is provided, in the lower tip portion 13$^C$, with a central cylindrical bore 13$^F$ which extends at its upper end into the cavity 13$^B$ but is closed at its upper end with a removable plug or socket screw 15 to prevent flow of the cooling fluid into the bore 13$^F$.

At its lower end, the bore 13$^F$ communicates with a cylindrical bore 13$^G$ which is preferably larger in diameter than the bore 13$^F$ and preferably of a diameter equal to the width of the slot 13$^R$. The slot 13$^R$ extends transversely of the electrode contact end 13$^D$ and is open at such end 13$^D$ to provide the spaced flat contact faces 13$^E$.

A pilot 16 preferably made of hardened steel having a shank 16$^A$ tightly fitted into an insulation sleeve or fiber bushing 17 is securely mounted in the bore 13$^G$ in such position that the upper end of the bushing 17 is supported in abutment with the shouldered upper end of the bore 13$^G$ and its lower end is aligned with the upper face of the slot 13$^R$ and so that the operative head 16$^B$ of the pilot 16 depends below the electrode contact faces 13$^E$.

As more clearly seen in Figs. 5 to 8 inclusive, the pilot head 16$^B$ is slightly widened in one transverse direction to extend beyond the shank 16$^A$ for bearing against the lower end of the bushing 17 and to provide a pair of flat opposed side faces 16$^C$; the head 16 being preferably formed with a curved lower edge and of less thickness, transversely to the side faces 16$^C$, than the diameter of the shank 16$^A$.

Assuming that the clamp band 10 is provided with the perforations 10$^E$ and with the protrusions 10$^P$ in the overlapped end portions 10$^C$, as shown in Figs. 1 and 2, the overlapped end portions 10$^C$ may be spot welded to one another and to the nut 11 by mounting the nut 11 upon the upper face 14$^A$ of the lower electrode 14, then placing the band end portions 10$^C$ in overlapped position upon the nut 11, as shown in Fig. 3, and then causing a movement of the upper electrode 13 downwardly to forcibly, and with the proper pressure, engage the overlapped portions 10$^C$ and nut 11 between the electrodes while electric current is caused to flow between the electrodes through spaced paths defined by the protrusions 10$^P$.

During momentarily applied pressure and under the heat produced by the concentrated flow of electric current between the electrodes through the protrusions 10$^P$, the protrusions 10$^P$ will collapse and form spot welds within the areas of such protrusions to thereby securely spot weld the overlapped portions 10$^C$ to the nut 11.

Just prior to such spot welding operation and during the movement of the upper electrode toward the lower electrode, the head 16$^B$ of the pilot 16 will pass into the clamp band perforations 10$^E$ and preferably partially into the threaded opening in the nut 11 just at the moment when the flat electrode contact faces 13$^E$ engage the upper one of the overlapped band portions 10$^C$ and the relative positions of the pilot head 16$^B$, band portions 10$^C$, and nut 11, at such moment of contact are illustrated in Figs. 5 and 6 and, from such illustrations, it will be apparent that the protrusions 10$^P$ constitute defined and restricted paths for the flow of the electric current through the overlapped band portions 10$^C$ and the nut 11 and that, under pressure applied through the flat contact faces 13$^E$ and the heat generated by the electric current, such protrusions 10$^P$ readily collapse and form the desired spot welds whereby the overlapped band end portions 10$^C$ are securely spot welded to the nut 11 by my improved flat faced electrode.

Among the advantages attained by my improved spot welding electrode through its novel structural features such as the flat contact faces 13$^E$ the ventilation provided by the transverse slot or recess 13$^R$, and the pilot 16 are the following:

(a) A substantial reduction in the incidental welding flash;

(b) A substantial reduction in the accompanying discharge of molten metal or oxides;

(c) The advantageous results attained through the combination of the transverse ventilating slot and pilot whereby the pilot functions as a locator for the electrode to guide it into proper contact positioning upon and over the indentations 10$^P$ of the overlapped band portions and whereby the pilot also functions as a fender or director of the welding flash and the accompanying discharge of molten metal or oxides away from the threaded opening in the nut 11 through the open ends of the slot 13$^R$, thus fending and protecting the threads in the nut 11 from impingement thereon of particles of molten metal;

(d) Increased efficiency in spot welding operations through the simultaneous welding of multiple spots;

(e) Increased efficiency through elimination of the operation of retapping of the threads in the nut 11; and (f) Reduction in cost of maintenance of a clean contact face of the electrode by the reduction of the welding flash and accompanying particles of fine molten metal and the forceful discharge of such reduced quantity of particles of molten metal through the ventilating slot whereby the electrode tends to be self-cleaning.

It may be noted that my improved flat faced electrode is particularly adapted to spot welding of members or parts which are provided with preferably integral offset protrusions such as, for example, the protrusions 10$^P$ shown die-stamped into the overlapped portions 10$^C$ of the clamp band 10 in Figs. 1 and 2. The vertical center-line of such protrusions 10$^P$ being disposed perpendicularly to the horizontal plane of the flat contact face of the electrode. Obviously, spot welding operations can readily be performed with my flat faced electrode where such members or parts to be welded are not provided with integral protrusions, such as the protrusions 10$^P$, as in lieu of such protrusions suitable small metallic discs or washers may be interposed between the members and parts to be spot welded thereat.

To increase the ventilation through the slot 13$^R$, I prefer to make the transverse thickness of the pilot head 16$^B$ of less width than the width of the slot.

From the above description and attached drawing it will be readily apparent that my improved electrode is particularly adapted to operations where multiple of spot welds are desired to be simultaneously performed in one operation as in spot welding one or more metallic members to another metallic part where one or more of said members or said part are initially, prior to welding, slightly separated by one or more metallic spacer formations, or spacer protrusions formed integrally with one or more of said members or said part, and through which spacer formations or protrusions the welding current is concentrated in its flow between the electrodes to thereby effect a spot welded connection of said one or more members to said part by combined pressure and fusion of said formations or protrusions.

I claim:

1. A spot welding electrode having a flat work-engaging end provided with a slot dividing said work-engaging end into a pair of spaced flat plane-aligned spot welding contact faces, and a pilot mounted in the electrode and extending through said slot outwardly from the electrode beyond said plane-aligned contact faces, said pilot being electrically insulated from the body of the electrode.

2. A spot welding electrode having a flat work-engaging end provided with a slot dividing said work-engaging end into a pair of spaced flat plane-aligned spot welding contact faces, and a pilot removably mounted in and electrically insulated from the body of the electrode and extending through said slot outwardly of the work-engaging end beyond the plane of said contact faces, said pilot being of less width than said slot.

3. A spot welding electrode comprising an elongated vertically disposed body having a cavity therein for a cooling fluid, a bore within said body below said cavity, said body having a flat work-engaging end, a slot disposed transversely of the electrode body dividing said work-engaging end into a pair of spaced plane-aligned spot welding contact faces, said bore extending at its upper end into communication with said cooling fluid cavity and at its lower end into communication with said slot, removable closure means closing communication between said cavity and said bore, and a pilot removably mounted in the lower end of said bore, means in said bore for insulating said pilot electrically from the body of the electrode, said pilot being of less width than said slot and extending downwardly through said slot beyond the plane of said spaced contact faces.

4. A spot welding electrode as defined in claim 3, said bore having a diametrically enlarged lower end portion, said insulating means comprising a sleeve of insulating material securely engaging therein the upper end portion of said pilot, and said pilot having a head slightly wider, longitudinally of said slot, than the said upper end portion thereof which is secured within said sleeve and the lower portion of said head terminating in a plane spaced from the plane of said contact faces.

5. In spot welding apparatus including an upper electrode and a lower electrode adapted for simultaneously spot welding a pair of overlapped end portions of a circular metallic clamp band to a face of a nut having a threaded opening therein, said overlapped end portions each being provided with a perforation in alignment with the opening in said nut and each having integral protrusions so arranged that the protrusions of one of said portions are nested in the protrusions of the other one of said portions and through which protrusions the welding current is concentrated in its flow between the electrodes to thereby effect a spot welded connection of said overlapped end portions to said nut by combined pressure and fusion of said protrusions, said lower electrode having a flat work-supporting contact face, said upper electrode having a flat work-engaging end provided with a transverse slot dividing said work-engaging end into a pair of spaced plane-aligned spot welding contact faces, and a pilot mounted in said work-engaging end of the upper electrode, electrically insulated therefrom, extending through said slot beyond the plane of said aligned contact faces to thereby permit said pilot to enter said aligned perforations of said overlapped end portions and the threaded opening of said nut prior to the pressure engagement welding operation of said overlapped band end portions to said nut by said electrodes.

6. A spot welding electrode having a slotted work-engaging end divided into a plurality of spaced flat spot welding contact faces, and a pilot mounted in and electrically insulated from the body of the electrode and extending through the slotted portion of the electrode outwardly beyond said contact faces.

JOSEPH HOEH.